(12) United States Patent
Slutz (10) Patent No.: US 9,003,404 B2
(45) Date of Patent: Apr. 7, 2015

(54) DETERMINING HARDWARE FUNCTIONALITY IN A CLOUD COMPUTING ENVIRONMENT

(75) Inventor: Donald C. Slutz, Milford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 161 days.

(21) Appl. No.: 13/427,114

(22) Filed: Mar. 22, 2012

(65) Prior Publication Data
US 2013/0254763 A1 Sep. 26, 2013

(51) Int. Cl.
G06F 9/455 (2006.01)

(52) U.S. Cl.
CPC .... *G06F 9/45558* (2013.01); *G06F 2009/4557* (2013.01)

(58) Field of Classification Search
CPC ...................................................... G06F 9/4881
USPC ............................................................ 718/1
See application file for complete search history.

(56) References Cited

U.S. PATENT DOCUMENTS

| | | | | |
|---|---|---|---|---|
| 2006/0277546 | A1* | 12/2006 | Rothman et al. | 718/103 |
| 2007/0300241 | A1* | 12/2007 | Prakash et al. | 719/321 |
| 2009/0031308 | A1* | 1/2009 | Busche et al. | 718/101 |
| 2010/0191833 | A1* | 7/2010 | Hofrichter et al. | 709/219 |
| 2011/0258621 | A1* | 10/2011 | Kern | 718/1 |
| 2011/0288847 | A1* | 11/2011 | Narayanan et al. | 703/19 |
| 2012/0060146 | A1* | 3/2012 | Maurer | 717/110 |
| 2012/0137290 | A1* | 5/2012 | Berg et al. | 718/1 |
| 2013/0060933 | A1* | 3/2013 | Tung et al. | 709/224 |
| 2013/0086234 | A1* | 4/2013 | Salsburg | 709/223 |
| 2013/0232498 | A1* | 9/2013 | Mangtani et al. | 718/104 |

OTHER PUBLICATIONS

H. Andérs Lagar-Cavilla, Joseph A. Whitney, Adin Scannell, Philip Patchin, Stephen M. Rumble, Eyal de Lara, Michael Brudno, M. Satyanarayanan, SnowFlock: Rapid Virtual Machine Cloning for Cloud Computing, Apr. 1-3, 2009, ACM, EuroSys'09.*

Mark Gates, Ajay Tirumala, Jon Dugan, Kevin Gibbs, Iperf User Docs, Mar. 2003.*

* cited by examiner

*Primary Examiner* — Charles Swift
*Assistant Examiner* — Charlie Sun

(57) ABSTRACT

A device provides, to hardware associated with the device, a first request for hardware information, the first request being provided at a first time and via a virtual machine associated with the device. The device also receives, from the hardware and via the virtual machine, first hardware information based on the first request, and provides, to the hardware, a second request for hardware information, the second request being provided at a second time and via the virtual machine. The device further receives, from the hardware and via the virtual machine, second hardware information based on the second request, and calculates functionality of the hardware based on the first hardware information, the second hardware information, the first time, and the second time.

20 Claims, 9 Drawing Sheets

DETERMINING HARDWARE FUNCTIONALITY IN A CLOUD COMPUTING ENVIRONMENT

BACKGROUND

Cloud computing is the delivery of computing as a service rather than as a product, whereby shared resources, software, and information are provided to client devices (e.g., computers, smart phones, etc.) as a utility over a network, such as the Internet. Cloud computing environments provide computation, software, data access, and/or storage services that do not require end-user knowledge of a physical location and configuration of a system that delivers the services.

A data center is a facility used to house computer systems and associated components, such as telecommunication systems and storage systems. A data center generally includes redundant or backup power supplies, redundant data communications connections, environmental controls (e.g., air conditioning, fire suppression, etc.), and/or security devices. In one example, a data center may share information with a cloud computing environment that may be utilized by client devices.

A cloud device, in a cloud computing environment, may utilize a virtual machine (VM) that includes a software implementation of a machine (e.g., a computer) for executing a program like a physical machine. In one example, a virtual machine may enable an application provided in the cloud device, or in other cloud devices of the cloud computing environment, to securely communicate with hardware of the cloud device. The application may request functionality associated with the hardware (e.g., processor speed) so that the application may be properly configured for execution by the hardware. However, the virtual machine may cause the hardware functionality to be improperly communicated to the application, which, in turn, may cause the application to be improperly configured for the hardware. Thus, the improperly configured application may not be executed in the most efficient manner.

DETAILED DESCRIPTION OF PREFERRED EMBODIMENTS

The following detailed description refers to the accompanying drawings. The same reference numbers in different drawings may identify the same or similar elements.

Systems and/or methods described herein may enable an application to quickly determine functionality associated with hardware of a cloud computing environment device. In one example implementation, the application may utilize a component of the hardware to define a time period for determining the hardware functionality. The cloud computing environment device may configure the application based on the determined hardware functionality.

Figure 1:
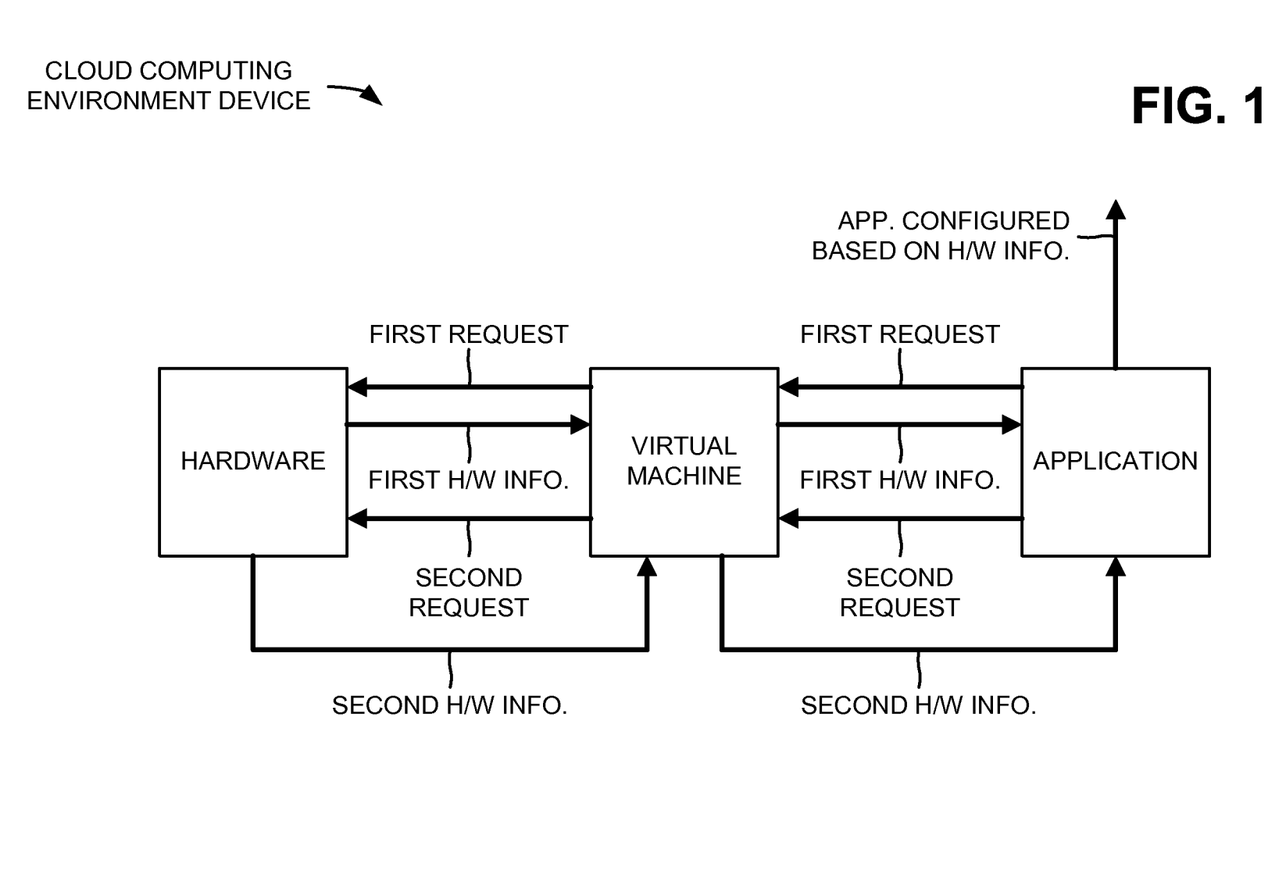
FIG. 1 is a diagram of an overview of an example implementation described herein.

FIG. 1 is a diagram of an overview of an example implementation described herein. As shown, a cloud computing environment device may include hardware, a virtual machine, and an application. The hardware may include any hardware used by the cloud computing environment device, such as a bus, a processing unit, memory, an input device, an output device, etc. The virtual machine may include a software implementation of a machine (e.g., a computer) for executing a program like a physical machine. The virtual machine may enable the application to securely communicate with the hardware (e.g., in an encrypted manner). The application may include a software application, such as word processing software, database software, content, monitoring software, financial software, communication software, and/or any other software capable of being provided via the cloud computing environment device.

As further shown in FIG. 1, the application may provide, to the virtual machine and at a first time, a first request for functionality associated with the hardware (e.g., a processor speed), and the virtual machine may securely provide the first request to the hardware. The hardware may receive the first request, and may provide, based on the first request, first hardware information to the virtual machine. The first hardware information may include functionality associated with the hardware at the first time, such as a number of cycles executed by the hardware. The virtual machine may securely provide the first hardware information to the application.

The application may provide, to the virtual machine and at a second time, a second request for functionality associated with the hardware, and the virtual machine may securely provide the second request to the hardware. The hardware may receive the second request, and may provide, based on the second request, second hardware information to the virtual machine. The second hardware information may include the functionality associated with the hardware at the second time, such as a number of cycles executed by the hardware. The virtual machine may securely provide the second hardware information to the application. The application may calculate the desired functionality of the hardware based on the first time, the second time, the first hardware information, and the second hardware information. In one example, the desired hardware functionality may include a processor speed of the hardware. The application may also be configured based on the calculated hardware functionality. For example, the application may be configured to execute in a particular way based on the processor speed of the hardware.

As used herein, the term "user" is intended to be broadly interpreted to include a client device, or a user of a client device.

The term "component," as used herein, is intended to be broadly construed to include hardware (e.g., a processor, a microprocessor, an application-specific integrated circuit (ASIC), a field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Figure 2:
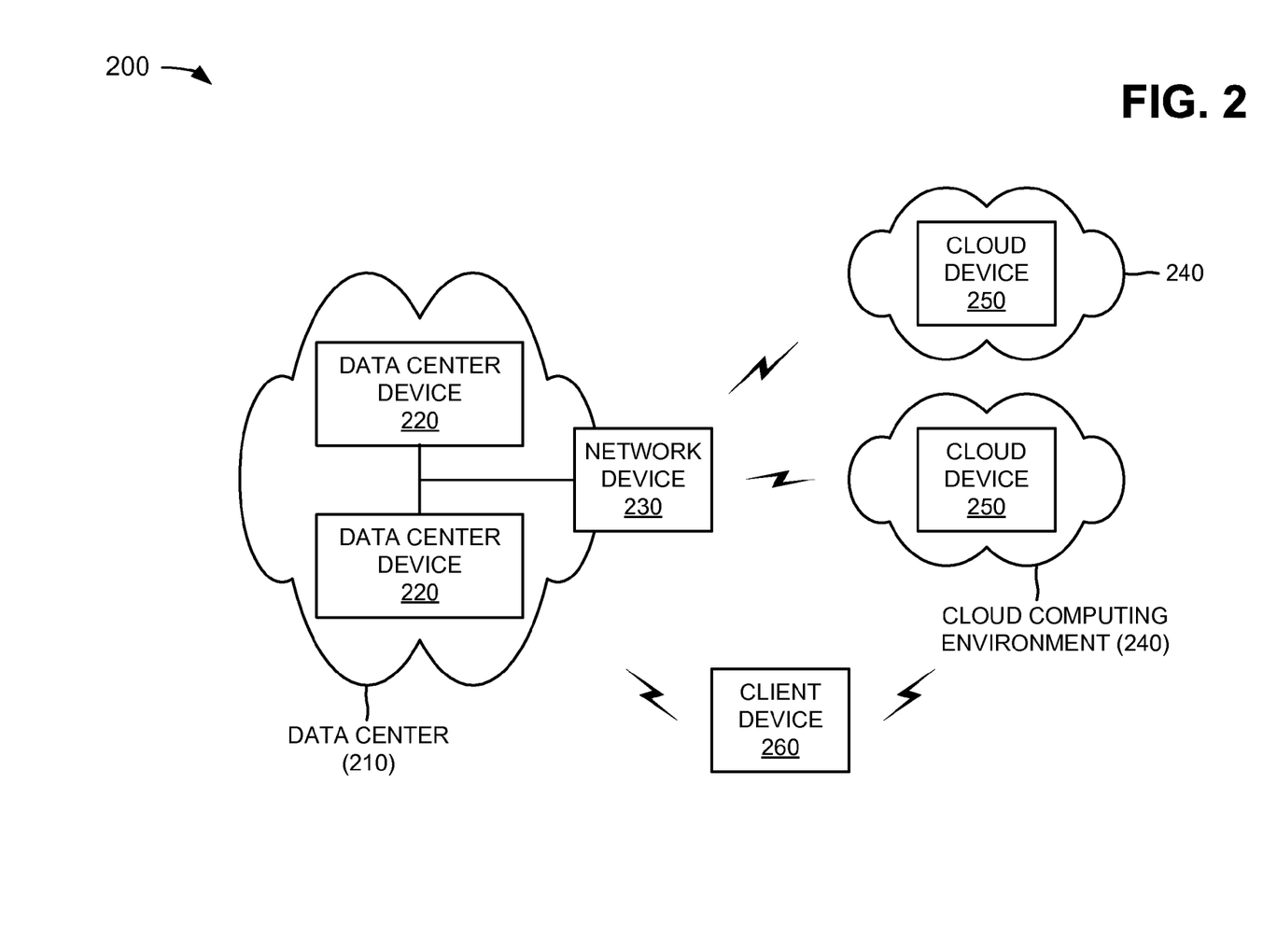
FIG. 2 is a diagram of an example network in which systems and/or methods described herein may be implemented.

FIG. 2 is a diagram of an example network 200 in which systems and/or methods described herein may be implemented. As illustrated, network 200 may include a data center 210 that includes data center devices 220 and a network device 230; cloud computing environments 240 that include cloud devices 250; and a client device 260. Devices and/or environments of network 200 may interconnect via wired and/or wireless connections. One data center 210, two data center devices 220, one network device 230, two cloud computing environments 240, two cloud devices 250, and one client device 260 have been illustrated in FIG. 2 for simplicity. In practice, there may be more data centers 210, data center devices 220, network devices 230, cloud computing environments 240, cloud devices 250, and/or client devices 260.

Data center 210 may include one or more facilities and/or one or more networks with computer systems, server devices, and associated components, such as telecommunications and storage systems. Data center 210 may include redundant or backup power supplies, redundant data communications connections, environmental controls, security devices, etc. In one example, data center 210 may share information, with cloud computing environment 240, which may be utilized by client device 260. Data center 210 may include resources, such as a device (e.g., a network device, a server, a computer system, etc.), data (e.g., availability information, license information, etc.), a service (e.g., a load balancing service, network information collection, etc.), etc.

Data center device 220 may include one or more server devices, or other types of computation and communication devices, that gather, process, search, and/or provide information in a manner described herein. In one example implementation, data center device 220 may receive shared resources, services, user objects, etc. from cloud computing environments 240 and/or cloud devices 250.

Network device 230 may include a gateway, a router, a switch, a firewall, a network interface card (NIC), a hub, a bridge, a proxy server, a multiplexer, or some other type of device that processes and/or transfers traffic. In one example implementation, network device 230 may include a firewall that creates encrypted tunnels with cloud devices 250 so that secure data paths may be provided between data center devices 220 and cloud devices 250.

Cloud computing environment 240 may include an environment that delivers computing as a service, whereby shared resources, services, user objects, etc. may be provided to data center device 220 and/or client device 260 as a utility over a network. Cloud computing environment 240 may provide computation, software, data access, and/or storage services that do not require end-user (e.g., data center device 220 and/or client device 260) knowledge of a physical location and configuration of system(s) and/or device(s) that deliver the services. In one implementation, cloud computing environment 240 may include a data center similar to data center 110.

Cloud device 250 may include one or more server devices, or other types of computation and communication devices, that gather, process, search, and/or provide information in a manner described herein. In one example implementation, cloud device 250 may provide cloud resources, cloud services, cloud user objects, etc. to data center device 220 and/or client device 260 as a utility over a network.

The cloud resources may include a compute instance executing in cloud device 250, a storage device provided in cloud device 250, a data transfer operation executed by cloud device 250, etc. The cloud services may include a virtual machine executing in cloud device 250, a virtual tunnel provided between network device 230 and cloud device 250, etc. The cloud user objects may include a server (e.g., a virtual machine of cloud device 250) that is managed by data center device 220.

Client device 260 may include a radiotelephone; a personal communications system (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a desktop computer; a workstation computer; or other types of computation and communication devices.

Although FIG. 2 shows example devices/networks of network 200, in other implementations, network 200 may include fewer devices/networks, different devices/networks, differently arranged devices/networks, or additional devices/networks than depicted in FIG. 2. Alternatively, or additionally, one or more devices/networks of network 200 may perform one or more tasks described as being performed by one or more other devices/networks of network 200.

Figure 3:
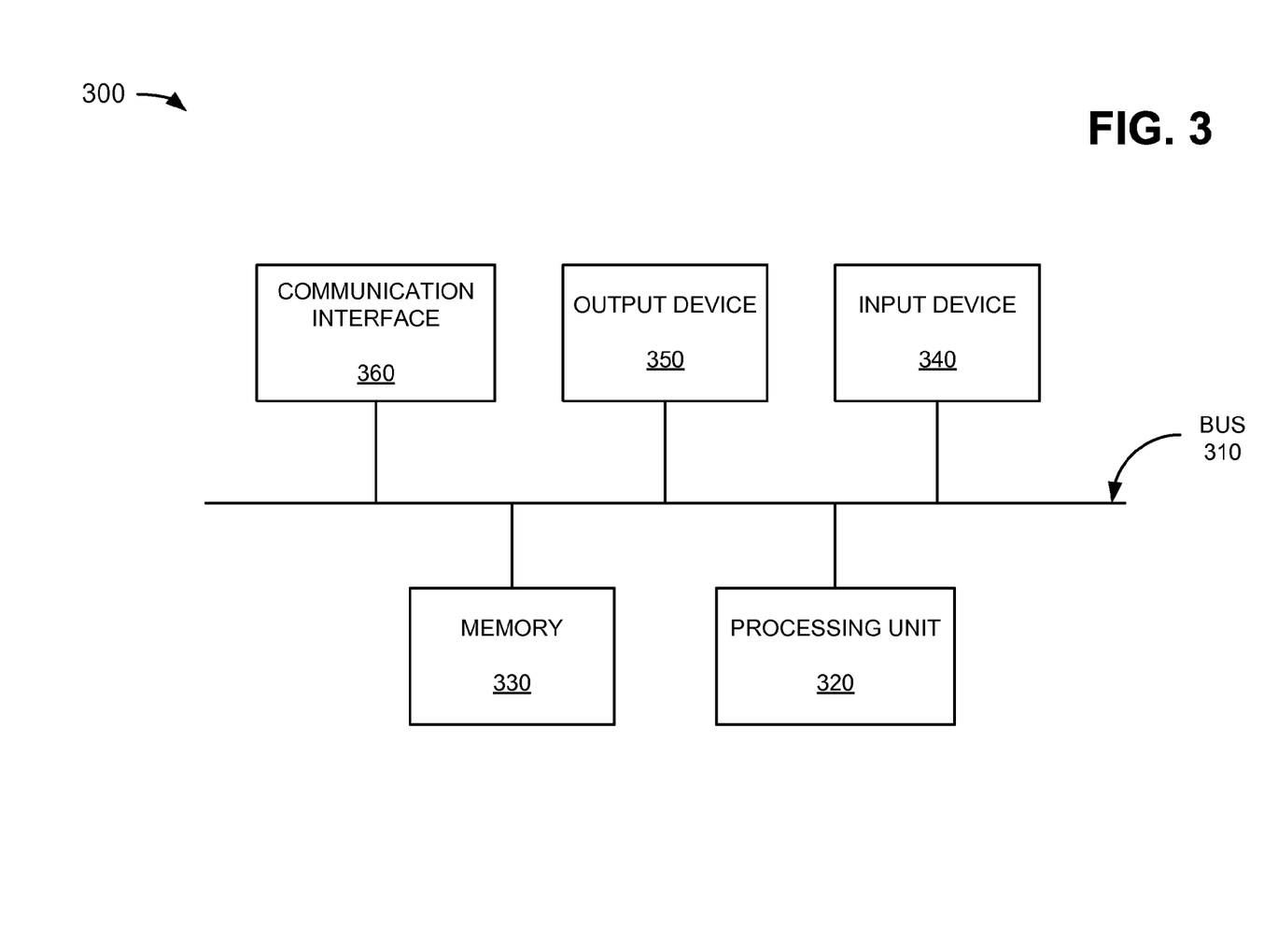
FIG. 3 is a diagram of example components of a device that may correspond to one of the devices of the network depicted in FIG. 2.

FIG. 3 is a diagram of example components of a device 300 that may correspond to one or more devices of network 200 (FIG. 2). In one example implementation, one or more of the devices of network 200 may include one or more devices 300 or one or more components of device 300. As illustrated in FIG. 3, device 300 may include a bus 310, a processing unit 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more ASICs, FPGAs, or the like.

Memory 330 may include a RAM or another type of dynamic storage device that stores information and instructions for execution by processing unit 320, a ROM or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a touch screen display, one or more biometric mechanisms, and the like. Output device 350 may include a device that outputs information to the operator, such as a display, a speaker, etc.

Communication interface 360 may include any transceiver-like mechanism that enables device 300 to communicate with other devices and/or systems. For example, communication interface 360 may include mechanisms for communicating with other devices, such as other devices of network 200.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, or additionally, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more tasks described as being performed by one or more other components of device 300.

Figure 4:
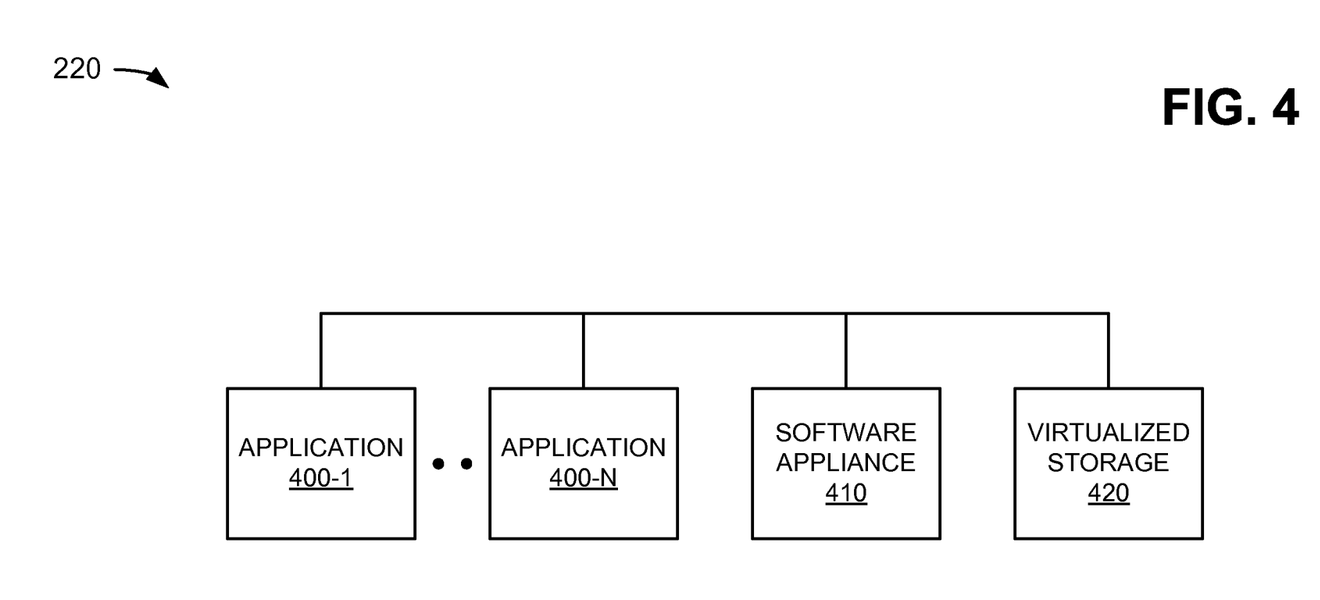
FIG. 4 is a diagram of example functional components of a data center device of FIG. 2.

FIG. 4 is a diagram of example functional components of data center device 220. In one implementation, the functions described in connection with FIG. 4 may be performed by one or more components of device 300 (FIG. 3) or by one or more devices 300. As shown in FIG. 4, data center device 220 may include multiple applications 400-1 through 400-N (collectively referred to herein as "applications 400," and, in some instances, singularly as "application 400"), a software appliance 410, and virtualized storage 420.

Applications 400 may include one or more software applications, available at data center device 220, which may depend upon the function assigned to data center device 220. For example, applications 400 may include software that handles core business and operational data of an organization, enterprise software, telecommunications software, etc. Applications 400 may be designed for execution by multiple host devices, where each host device may execute a single component. In one example, components of applications 400 may include databases, file servers, application servers, middleware, etc.

Software appliance 410 may securely bridge data center device 220 with cloud computing services provided by cloud computing environment 240. Software appliance 410 may extend data center 210 security and control into cloud computing environment 240. This may allow applications 400 to remain integrated with data center 210 tools and policies and to be managed as if applications 400 were executing locally at client device 260. Software appliance 410 may move applications 400 between data center 210 and cloud computing environment 240 based on requirements of an organization. In one example, software appliance 410 may include management components for discovering applications 400, orchestrating cloud deployments, and/or managing cloud utilization. Software appliance 410 may create a secure data path to bridge network connectivity between data center 210 and a chosen provider of cloud computing environment 240. In one example implementation, data center device 220 may utilize multiple software appliances 210 for availability and scaling purposes.

Virtualized storage 420 may include one or more storage systems and/or one or more devices that use virtualization techniques to enable better functionality and more advanced features within the storage systems and/or the devices of data center device 220. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Although FIG. 4 shows example functional components of data center device 220, in other implementations, data center device 220 may include fewer functional components, different functional components, differently arranged functional components, or additional functional components than depicted in FIG. 4. Additionally, or alternatively, one or more functional components of data center device 220 may perform one or more tasks described as being performed by one or more other functional components of data center device 220.

Figure 5:
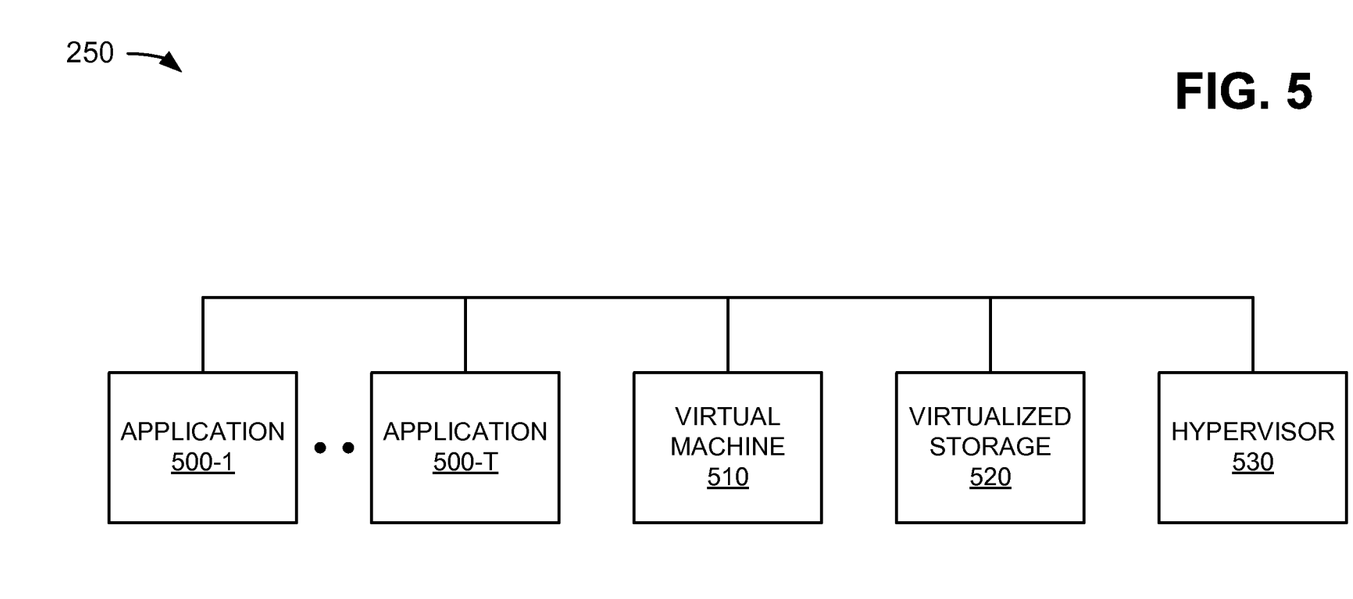
FIG. 5 is a diagram of example functional components of a cloud device of FIG. 2.

FIG. 5 is a diagram of example functional components of cloud device 250. In one implementation, the functions described in connection with FIG. 5 may be performed by one or more components of device 300 (FIG. 3) or by one or more devices 300. As shown in FIG. 5, cloud device 250 may include multiple applications 500-1 through 500-T (collectively referred to herein as "applications 500," and, in some instances, singularly as "application 500"), a virtual machine 510, virtualized storage 520, and a hypervisor 530.

Applications 500 may include one or more software applications that may be provided to or accessed by client device 260. Applications 500 may eliminate a need to install and execute the software applications on client device 260. For example, applications 500 may include word processing software, database software, content, monitoring software, financial software, communication software, and/or any other software capable of being provided via cloud computing environment 240. In one example implementation, one application 500 may communicate information (e.g., traffic) with one or more other applications 500, via virtual machine 510.

Virtual machine (VM) 510 may include a software implementation of a machine (e.g., a computer) that executes programs like a physical machine. Virtual machine 510 may be either a system virtual machine or a process virtual machine, depending upon use and degree of correspondence to any real machine by virtual machine 510. A system virtual machine may provide a complete system platform that supports execution of a complete operating system (OS). A process virtual machine may execute a single program, and may support a single process. In one example implementation, virtual machine 510 may execute on behalf of a data center 210 user (e.g., client device 260), and may manage infrastructure of cloud computing environment 240, such as data management, synchronization, and long-duration data transfers. Virtual machine 510 may provide encryption services for network and storage utilization to ensure that cloud computing environment providers do not have access to data center 210 network or storage communications.

Virtualized storage 520 may include one or more storage systems and/or one or more devices that use virtualization techniques to enable better functionality and more advanced features within the storage systems or devices of cloud device 250. In one example, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system greater flexibility in how they manage storage for end users. File virtualization may eliminate dependencies between data accessed at a file level and a location where files are physically stored. This may enable optimization of storage use, server consolidation, and/or performance of non-disruptive file migrations.

Hypervisor 530 may provide hardware virtualization techniques that allow multiple operating systems (e.g., "guest operating systems") to execute concurrently on a host computer. Hypervisor 530 may present to the guest operating systems a virtual operating platform, and may manage the execution of the guest operating systems. Multiple instances of a variety of operating systems may share virtualized hardware resources. Hypervisor 530 may provide an interface to infrastructure as a service (IaaS) provided by cloud computing environment 240.

Although FIG. 5 shows example functional components of cloud device 250, in other implementations, cloud device 250 may include fewer functional components, different functional components, differently arranged functional components, or additional functional components than depicted in FIG. 5. Additionally, or alternatively, one or more functional components of cloud device 250 may perform one or more tasks described as being performed by one or more other functional components of cloud device 250.

Figure 6:
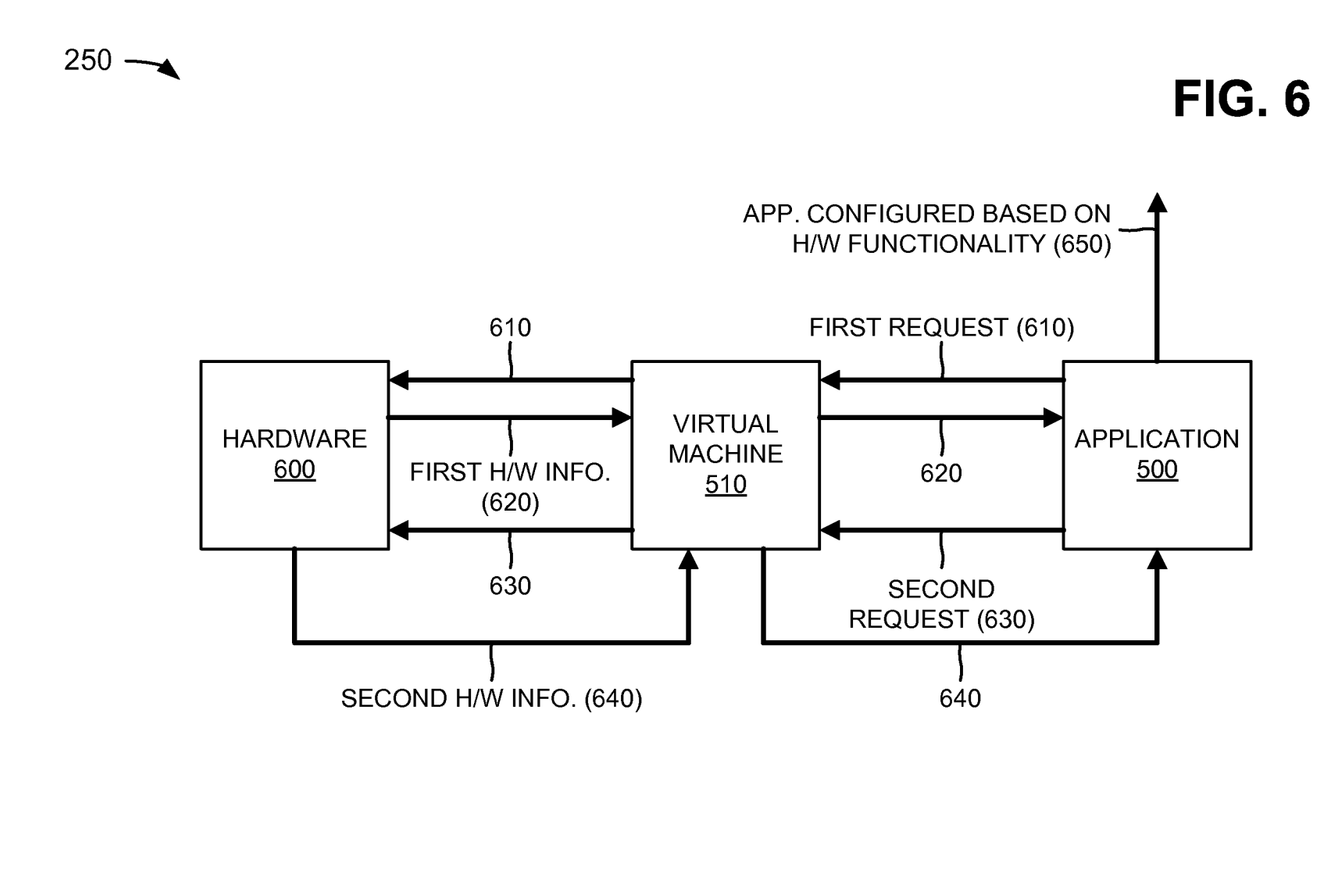
FIG. 6 is a diagram of example operations capable of being performed by functional components of the cloud device.

FIG. 6 is a diagram of example operations capable of being performed by functional components of cloud device 250. In one implementation, the functions described in connection with FIG. 6 may be performed by one or more components of device 300 (FIG. 3) or by one or more devices 300. As shown in FIG. 6, cloud device 250 may include application 500, virtual machine 510, and hardware 600. Cloud device 250, application 500, and virtual machine 510 may include the features described above in connection with, for example, one or more of FIGS. 2, 3, and 5.

Hardware 600 may include one or more components of device 300 (FIG. 3). For example, hardware 600 may include bus 310, processing unit 320, memory 330, input device 340, output device 350, communication interface 360, etc. In one example implementation, hardware 600 may include time-related functionality, such as a processing speed of processing unit 320 (e.g., in cycles per time), a bus speed of processing unit 320, etc.

As further shown in FIG. 6, application 500 may provide, to virtual machine 510 and at a first time, a first request 610 for functionality associated with hardware 600 (e.g., a processor speed, a bus speed of a processor, etc.), and virtual machine 510 may securely provide first request 610 to hardware 600. Hardware 600 may receive first request 610, and may provide first hardware information 620 to virtual machine 510 based on first request 610. First hardware information 620 may include time-related functionality associated with hardware 600 at the first time. For example, if the time-related functionality is a speed of processing unit 320, first hardware information 620 may include a number of cycles executed by processing unit 320 at the first time. Alternatively, or additionally, if the time-related functionality is a bus speed of processing unit 320, first hardware information 620 may include a number of data units sent or received by processing unit 320 at the first time. The time-related functionality may also, or alternatively, include a load on processing unit 320, a capacity of processing unit 320, etc. Virtual machine 510 may securely provide first hardware information 620 to application 500, and application 500 may receive first hardware information 620.

Application 500 may provide, to virtual machine 510 and at a second time, a second request 630 for functionality associated with hardware 600, and virtual machine 510 may securely provide second request 630 to hardware 600. In one example implementation, the first time and the second time may be determined by a timer component associated with hardware 600, as described below in connection with FIG. 7. Hardware 600 may receive second request 630, and may provide second hardware information 640 to virtual machine 510 based on second request 630. Second hardware information 640 may include the time-related functionality associated with hardware 600 at the second time. For example, second hardware information 640 may include a number of cycles executed by processing unit 320 at the second time, a number of data units sent or received by processing unit 320 at the second time, etc.

Virtual machine 510 may securely provide second hardware information 640 to application 500, and application 500 may receive second hardware information 640. Application 500 may calculate the desired functionality of hardware 600 based on the first time, the second time, first hardware information 620, and second hardware information 640. For example, if the desired functionality of hardware 600 is a speed of processing unit 320, application 500 may subtract the cycles at the first time (e.g., provided by first hardware information 620) from the cycles at the second time (e.g., provided by second hardware information 640) to obtain a cycle difference. Application 500 may subtract the first time from the second time to obtain a time difference, and may divide the cycle difference by the time difference to determine the speed of processing unit 320 (e.g., in cycles per unit time, Hertz, etc.).

Application 500 may be configured based on the calculated hardware functionality, as indicated by reference number 650. For example, application 500 may be configured to execute in a particular way (e.g., more quickly) if the speed of processing unit 320 is a particular value (e.g., a high value), and may be configured to execute in another way (e.g., more slowly) if the speed of processing unit 320 is another value (e.g., a low value).

Although FIG. 6 shows example operations capable of being performed by functional components of cloud device 250, in other implementations, cloud device 250 may include fewer functional components, different functional components, differently arranged functional components, or additional functional components than depicted in FIG. 6. Additionally, or alternatively, one or more functional components of cloud device 250 may perform one or more tasks described as being performed by one or more other functional components of cloud device 250.

In one example implementation, application 500 and virtual machine 510 may be provided in a cloud device 250 that is separate and distinct from a cloud device 250 containing hardware 600. Alternatively, or additionally, application 500 may be provided in a cloud device 250 that is separate and distinct from a cloud device 250 containing virtual machine 510 and hardware 600.

Figure 7:
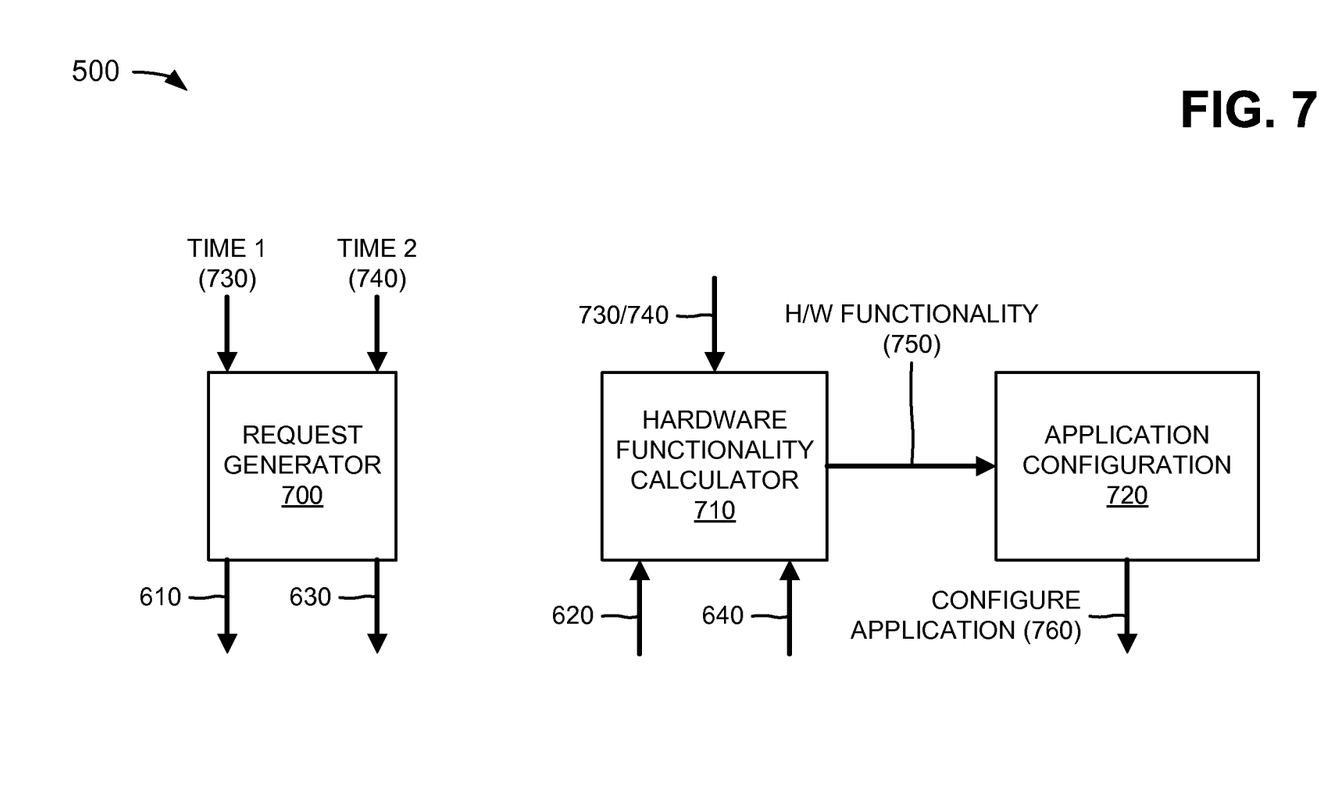
FIG. 7 is a diagram of example operations capable of being performed by an application of the cloud device.

FIG. 7 is a diagram of example operations capable of being performed by application 500. In one implementation, the functions described in connection with FIG. 7 may be performed by one or more components of device 300 (FIG. 3) or by one or more devices 300. As shown in FIG. 7, application 500 may include a request generator component 700, a hardware functionality calculator component 710, and an application configuration component 720.

Request generator component 700 may receive a first time 730 and a second time 740 from a component associated with hardware 600 (not shown in FIG. 7). In one example implementation, the component of hardware 600 from which request generator component 700 may receive first time 730 and second time 740 may depend on an operating system associated with application 500. For example, if application 500 is associated with a Windows-based operating system, request generator component 700 may receive first time 730 and second time 740 from a power management (PM) timer associated with hardware 600. Alternatively, or additionally, if application 500 is associated with a Linux-based operating system, request generator component 700 may receive first time 730 and second time 740 from a programmable interval timer (PIT) associated with hardware 600. In one example, first time 730 may be earlier in time than second time 740, and the difference between first time 730 and second time 740 may define a time period (e.g., one, two, etc. seconds, minutes, etc.).

Request generator component 700 may provide, to virtual machine 510 (not shown in FIG. 7) and at first time 730, first request 610 for functionality associated with hardware 600, and virtual machine 510 may securely provide first request 610 to hardware 600. First request 610 may request first hardware information 620 from hardware 600. Request generator component 700 may provide, to virtual machine 510 and at second time 740, second request 630 for functionality associated with hardware 600, and virtual machine 510 may securely provide second request 630 to hardware 600. Second request 620 may request second hardware information 640 from hardware 600.

Hardware functionality calculator component 710 may receive first time 730 and second time 740 from the component associated with hardware 600. Hardware functionality calculator component 710 may receive first hardware information 620 and second hardware information 640 from hardware 600. First hardware information 620 may include time-related functionality associated with hardware 600 at first time 730. Second hardware information 640 may include the time-related functionality associated with hardware 600 at second time 740.

Hardware functionality calculator component 710 may calculate functionality 750 associated with hardware 600 based on first hardware information 620, second hardware information 640, first time 730, and second time 740. For example, if hardware functionality 750 is a speed of processing unit 320, hardware functionality calculator component 710 may subtract the cycles at first time 730 (e.g., provided by first hardware information 620) from the cycles at second time 740 (e.g., provided by second hardware information 640) to obtain a cycle difference. Hardware functionality calculator component 710 may subtract first time 730 from second time 740 to obtain a time period, and may divide the cycle difference by the time period to determine the speed of processing unit 320. As further shown in FIG. 7, hardware functionality calculator component 710 may provide hardware functionality 750 to application configuration component 720.

Application configuration component 720 may receive hardware functionality 750 from hardware functionality calculator component 710, and may configure application 500 based on hardware functionality 750, as indicated by reference number 760. For example, application configuration component 720 may configure application 500 to execute in a particular way (e.g., more quickly) if the speed of processing unit 320 is a particular value (e.g., a high value), and may configure application 500 to execute in another way (e.g., more slowly) if the speed of processing unit 320 is another value (e.g., a low value).

Although FIG. 7 shows example operations capable of being performed by functional components of application 500, in other implementations, application 500 may include fewer functional components, different functional components, differently arranged functional components, or additional functional components than depicted in FIG. 7. Additionally, or alternatively, one or more functional components of application 500 may perform one or more tasks described as being performed by one or more other functional components of application 500.

Figure 8:
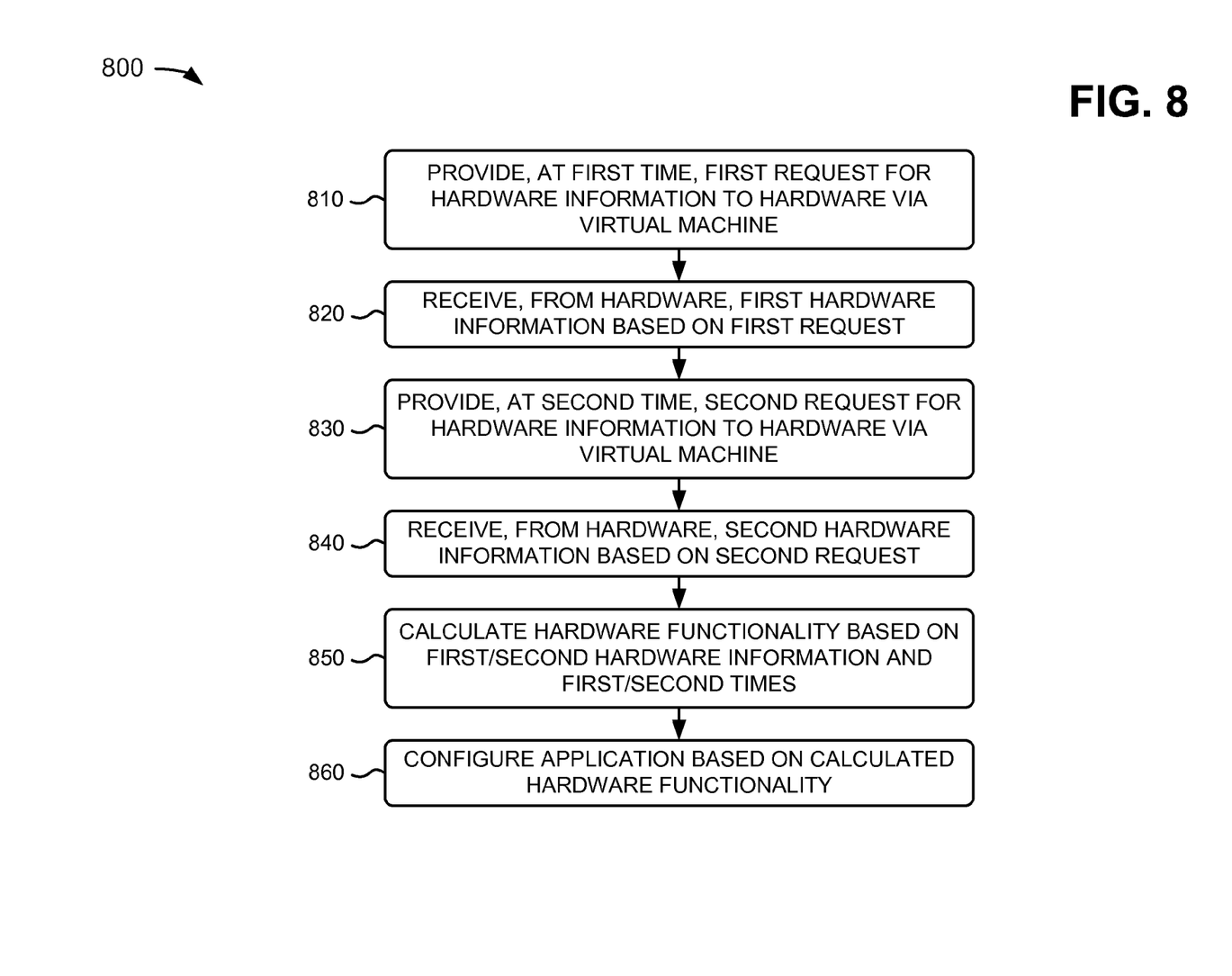
FIGS. 8 and 9 are flow charts of an example process for determining hardware functionality in a cloud computing environment according to an implementation described herein.
Figure 9:
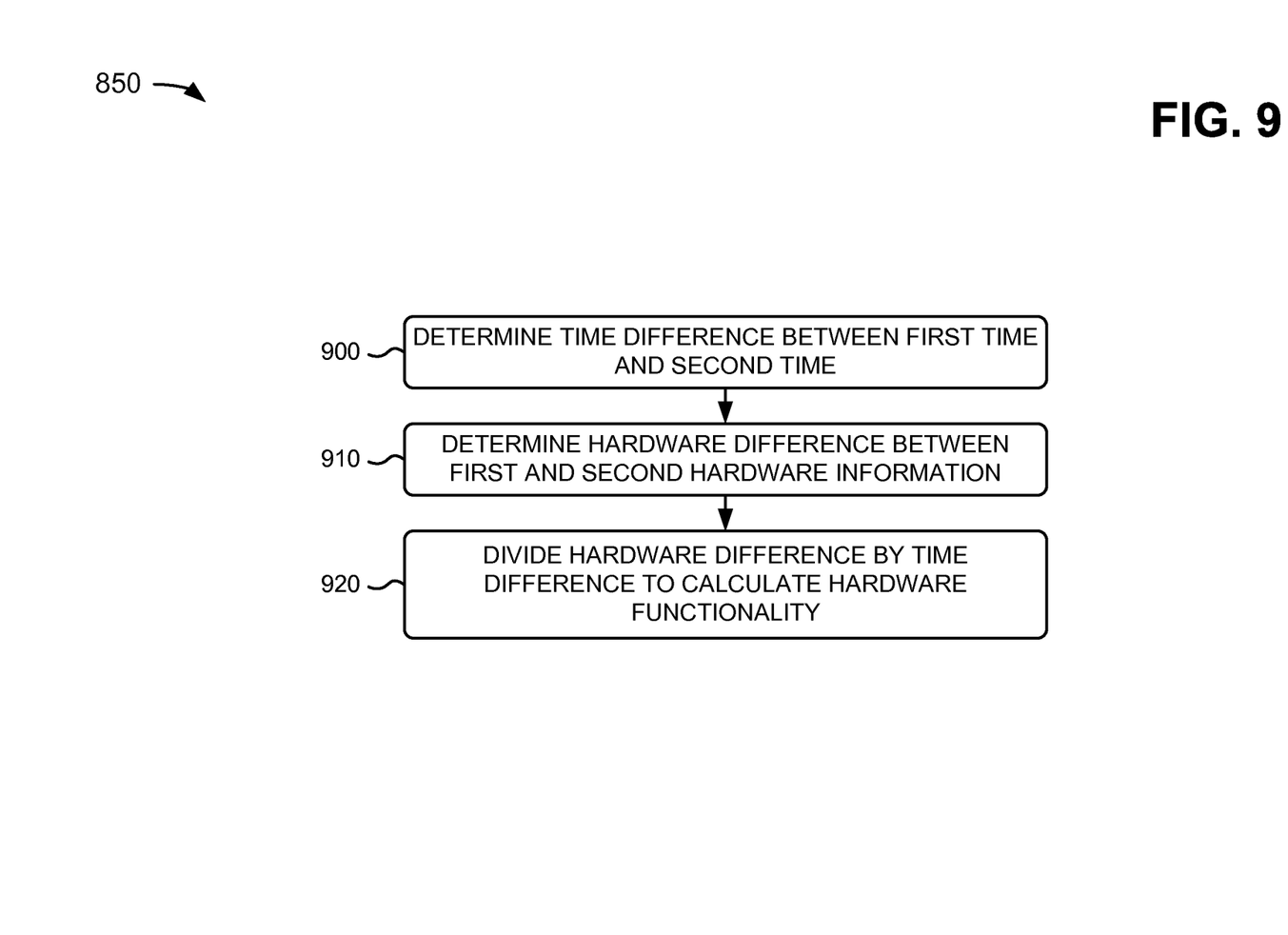

FIGS. 8 and 9 are flow charts of an example process 800 for determining hardware functionality in a cloud computing environment according to an implementation described herein. In one implementation, process 800 may be performed by one or more cloud devices 250. Alternatively, or additionally, some or all of process 800 may be performed by another device or group of devices, including or excluding one or more cloud devices 250.

As shown in FIG. 8, process 800 may include providing, at a first time, a first request for hardware information to hardware via a virtual machine (block 810), and receiving, from the hardware, first hardware information based on the first request (block 820). For example, in an implementation described above in connection with FIG. 6, application 500 may provide, to virtual machine 510 and at a first time, first request 610 for functionality associated with hardware 600 (e.g., a processor speed, a bus speed of a processor, etc.), and virtual machine 510 may securely provide first request 610 to hardware 600. Hardware 600 may receive first request 610, and may provide first hardware information 620 to virtual machine 510 based on first request 610. First hardware information 620 may include time-related functionality associated with hardware 600 at the first time. Virtual machine 510 may securely provide first hardware information 620 to application 500, and application 500 may receive first hardware information 620.

As further shown in FIG. 8, process 800 may include providing, at a second time, a second request for hardware information to the hardware via the virtual machine (block 830), and receiving, from the hardware, second hardware information based on the second request (block 840). For example, in an implementation described above in connection with FIG. 6, application 500 may provide, to virtual machine 510 and at a second time, second request 630 for functionality associated with hardware 600, and virtual machine 510 may securely provide second request 630 to hardware 600. Hardware 600 may receive second request 630, and may provide second hardware information 640 to virtual machine 510 based on second request 630. Virtual machine 510 may securely provide second hardware information 640 to application 500, and application 500 may receive second hardware information 640.

Returning to FIG. 8, process 800 may include calculating hardware functionality based on the first hardware information, the second hardware information, the first time, and the second time (block 850), and configuring an application based on the calculated hardware functionality (block 860). For example, in an implementation described above in connection with FIG. 6, application 500 may calculate the desired functionality of hardware 600 based on the first time, the second time, first hardware information 620, and second hardware information 640. In one example, if the desired functionality of hardware 600 is a speed of processing unit 320, application 500 may subtract the cycles at the first time from the cycles at the second time to obtain a cycle difference. Application 500 may subtract the first time from the second time to obtain a time difference, and may divide the cycle difference by the time difference to determine the speed of processing unit 320. Application 500 may be configured based on the calculated hardware functionality, as indicated by reference number 650. In one example, application 500 may be configured to execute in a particular way if the speed of processing unit 320 is a particular value, and may be configured to execute in another way if the speed of processing unit 320 is another value.

Process block 850 may include the process blocks depicted in FIG. 9. As shown in FIG. 9, process block 850 may include determining a time difference between the first time and the second time (block 900), determining a hardware difference between the first hardware information and the second hardware information (block 910), and dividing the hardware difference by the time difference to calculate the hardware functionality (block 920). For example, in an implementation described above in connection with FIG. 7, if hardware functionality 750 is a speed of processing unit 320, hardware functionality calculator component 710 may subtract the cycles at first time 730 (e.g., provided by first hardware information 620) from the cycles at second time 740 (e.g., provided by second hardware information 640) to obtain a cycle difference. Hardware functionality calculator component 710 may subtract first time 730 from second time 740 to obtain a time period, and may divide the cycle difference by the time period to determine the speed of processing unit 320.

Systems and/or methods described herein may enable an application to quickly determine functionality associated with hardware of a cloud computing environment device. In one example implementation, the application may utilize a component of the hardware to define a time period for determining the hardware functionality. The cloud computing environment device may configure the application based on the determined hardware functionality.

The foregoing description of implementations provides illustration and description, but is not intended to be exhaustive or to limit the implementations to the precise form disclosed. Modifications and variations are possible in light of the above disclosure or may be acquired from practice of the implementations.

For example, while series of blocks have been described with regard to FIGS. 8 and 9, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   providing, by a first device associated with a cloud computing environment and to hardware associated with a second device associated with the cloud computing environment, a first request for first hardware information,
   the second device being different from the first device, and
   the first request being provided at a first time and via a secure connection enabled by a virtual machine included in the first device;
   receiving, by the first device and from the hardware associated with the second device, the first hardware information based on the first request,
   the first hardware information being received via the secure connection;
   providing, by the first device and to the hardware associated with the second device, a second request for second hardware information,
   the second request being provided at a second time and via the secure connection;
   receiving, by the first device and from the hardware associated with the second device, the second hardware information based on the second request,
   the second hardware information being received via the secure connection;
   calculating, by the first device, a value associated with a functionality of the hardware associated with the second device based on the first hardware information, the second hardware information, the first time, and the second time;
   configuring, by the first device, an application based on the value associated with the functionality of the hardware associated with the second device; and
   causing, by the first device, the application to execute on the hardware associated with the second device based on configuring the application.

2. The method of claim 1, where the functionality, of the hardware associated with the second device, includes a time-related functionality associated with the hardware associated with the second device.

3. The method of claim 1, where calculating the value associated with the functionality of the hardware associated with the second device comprises:
   determining a time difference between the first time and the second time;
   determining a hardware difference between the first hardware information and the second hardware information; and
   dividing the hardware difference by the time difference to calculate the value associated with the functionality of the hardware associated with the second device.

4. The method of claim 1, where the first device comprises a cloud computing environment device provided in the cloud computing environment.

5. The method of claim 1, where the hardware associated with the second device, comprises a processor of the second device.

6. The method of claim 5, where the functionality of the hardware, associated with the second device includes a speed associated with the processor.

7. The method of claim 1, where receiving the first hardware information includes:
   receiving information indicating a first quantity of data units sent or received by the hardware associated with the second device at the first time;
   where receiving the second hardware information includes:

receiving information indicating a second quantity of data units sent or received by the hardware associated with the second device at the second time; and where calculating the value associated with the functionality of the hardware associated with the second device includes:

calculating a bus speed of the hardware associated with the second device based on the first quantity, the second quantity, the first time, and the second time.

8. A device, comprising:
a processor to:
provide, to hardware associated with another device, a first request for first hardware information,
the first request being provided at a first time and via a secure connection enabled by a virtual machine included in the device,
receive, from the hardware associated with the other device and via the secure connection, the first hardware information based on the first request,
provide, to the hardware associated with the other device, a second request for second hardware information,
the second request being provided at a second time and via the secure connection,
receive, from the hardware associated with the other device and via the secure connection, the second hardware information based on the second request,
calculate a value associated with a functionality of the hardware associated with the other device based on the first hardware information, the second hardware information, the first time, and the second time;
configure an application based on the calculated value associated with the functionality of the hardware associated with the other device; and
cause the application to execute on the hardware associated with the other device based on configuring the application.

9. The device of claim 8, where the functionality, of the hardware associated with the other device, includes a time-related functionality associated with the hardware associated with the other device.

10. The device of claim 8, where, when calculating the value associated with the functionality of the hardware associated with the other device, the processor is further to:
determine a time difference between the first time and the second time,
determine a hardware difference between the first hardware information and the second hardware information, and
divide the hardware difference by the time difference to calculate the value associated with the functionality of the hardware associated with the other device.

11. The device of claim 8, where the first time and the second time are generated by a timer component associated with the hardware associated with the other device.

12. The device of claim 8, where the hardware, associated with the other device, comprises a processor or a bus associated with the other device.

13. The device of claim 12, where the functionality of the hardware, associated with the other device, includes a speed associated with the processor or the bus associated with the other device.

14. The device of claim 8, where, when receiving the first hardware information, the processor is to:
receive information indicating a first quantity of data units sent or received by the hardware associated with the other device at the first time;

where, when receiving the second hardware information, the processor is to:
receive information indicating a second quantity of data units sent or received by the hardware associated with the other device at the second time; and
where, when calculating the value associated with the functionality of the hardware associated with the other device, the processor is to:
calculate a bus speed of the hardware associated with the other device based on the first quantity, the second quantity, the first time, and the second time.

15. A non-transitory computer-readable medium storing instructions, the instructions comprising:
one or more instructions that, when executed by one or more processors of a first device associated with a cloud computing environment, cause the one or more processors to:
provide, to hardware associated with a second device associated with the cloud computing environment, a first request for first hardware information,
the first request being provided at a first time and via a secure connection enabled by a virtual machine included in the first device,
receive, from the hardware associated with the second device and via the secure connection, the first hardware information based on the first request,
provide, to the hardware associated with the second device, a second request for second hardware information,
the second request being provided at a second time and via the secure connection,
receive, from the hardware associated with the second device and via the secure connection, the second hardware information based on the second request,
calculate a value associated with a functionality of the hardware associated with the second device based on the first hardware information, the second hardware information, the first time, and the second time;
configure an application based on the value associated with the functionality of the hardware associated with the second device; and
cause the application to execute on the hardware associated with the second device based on configuring the application.

16. The non-transitory computer-readable medium of claim 15, where the functionality of the hardware, associated with the second device, includes a time-related functionality associated with the hardware associated with the second device.

17. The non-transitory computer-readable medium of claim 15, where the one or more instructions to calculate the value associated with the functionality of the hardware associated with the second device include:
one or more instructions that, when executed by the one or more processors of the device, cause the one or more processors to:
determine a time difference between the first time and the second time,
determine a hardware difference between the first hardware information and the second hardware information, and
divide the hardware difference by the time difference to calculate the value associated with the functionality of the hardware associated with the second device.

18. The non-transitory computer-readable medium of claim 15, where the first device comprises a cloud computing environment device provided in the cloud computing environment.

19. The non-transitory computer-readable medium of claim 15, where:
the hardware associated with the second device comprises one or more other processors associated with the second device, and
the functionality, of the hardware associated with the second device, includes speeds associated with the one or more other processors.

20. The non-transitory computer-readable medium of claim 15, where the one or more instructions to receive the first hardware information include:
one or more instructions that, when executed by the one or more processors, cause the one or more processors to:
receive information indicating a first quantity of data units sent or received by the hardware associated with the second device at the first time;
where the one or more instructions to receive the second hardware information include:
one or more instructions that, when executed by the one or more processors, cause the one or more processors to:
receive information indicating a second quantity of data units sent or received by the hardware associated with the second device at the second time; and
where the one or more instructions to calculate the value associated with the functionality of the hardware associated with the second device include:
one or more instructions that, when executed by the one or more processors, cause the one or more processors to:
calculate a bus speed of the hardware associated with the second device based on the first quantity, the second quantity, the first time, and the second time.

* * * * *